(12) United States Patent
Weng et al.

(10) Patent No.: US 10,690,950 B2
(45) Date of Patent: Jun. 23, 2020

(54) TOUCH DISPLAY PANEL

(71) Applicant: HON HAI PRECISION INDUSTRY CO., LTD., New Taipei (TW)

(72) Inventors: Yu-Fu Weng, New Taipei (TW); Chien-Wen Lin, New Taipei (TW); Chia-Lin Liu, New Taipei (TW); Tzu-Yu Cheng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/112,617

(22) Filed: Aug. 24, 2018

(65) Prior Publication Data

US 2019/0391440 A1 Dec. 26, 2019

(30) Foreign Application Priority Data

Jun. 20, 2018 (CN) .......................... 2018 1 0637769

(51) Int. Cl.
*G02F 1/1333* (2006.01)
*G06F 3/044* (2006.01)
*G06F 3/041* (2006.01)
*G02F 1/1368* (2006.01)
*G02F 1/1335* (2006.01)

(52) U.S. Cl.
CPC ...... *G02F 1/133308* (2013.01); *G02F 1/1368* (2013.01); *G02F 1/13338* (2013.01); *G06F 3/044* (2013.01); *G06F 3/0412* (2013.01); *G02F 1/133514* (2013.01); *G02F 2001/13332* (2013.01); *G02F 2001/133314* (2013.01); *G02F 2001/133317* (2013.01); *G02F 2201/46* (2013.01); *G06F 2203/04105* (2013.01); *G06F 2203/04112* (2013.01)

(58) Field of Classification Search
None
See application file for complete search history.

(56) References Cited

U.S. PATENT DOCUMENTS

| 2015/0054803 A1* | 2/2015 | Yashiro | G06F 3/041 345/206 |
| 2017/0344146 A1* | 11/2017 | Sun | G06F 3/044 |
| 2018/0203539 A1* | 7/2018 | Huang | G06F 3/044 |

FOREIGN PATENT DOCUMENTS

| CN | 105531651 A | 4/2016 |
| CN | 105911736 A | 8/2016 |

* cited by examiner

*Primary Examiner* — James A Dudek
(74) *Attorney, Agent, or Firm* — ScienBiziP, P.C.

(57) ABSTRACT

A touch display device includes a touch display module. The touch display module includes a TFT substrate, a color filtering substrate, and a liquid crystal layer encapsulated between the TFT substrate and the color filtering substrate. A first electrode layer is formed on a surface of the color filtering substrate facing the TFT substrate. A second electrode layer is formed on a surface of the TFT substrate facing the color filtering substrate. The touch display device further includes at least one supporting element on a side of the touch display module. The supporting element is elastic and configured for elastically resisting against the touch display module.

1 Claim, 9 Drawing Sheets

TOUCH DISPLAY PANEL

FIELD

The subject matter herein generally relates to touch display panels.

BACKGROUND

On-cell or in-cell type touch screen devices can be manufactured by installing a touch device in a display device. Such a touch screen device can be used as an output device for displaying images and an input device for receiving a user's touch commands. However, the touch screen device does not always accurately sense the amount of touch force/pressure applied to the touch screen.

Therefore, there is room for improvement within the art.

BRIEF DESCRIPTION OF THE DRAWINGS

Implementations of the present technology will now be described, by way of example only, with reference to the attached figures.

DETAILED DESCRIPTION

Figure 1:
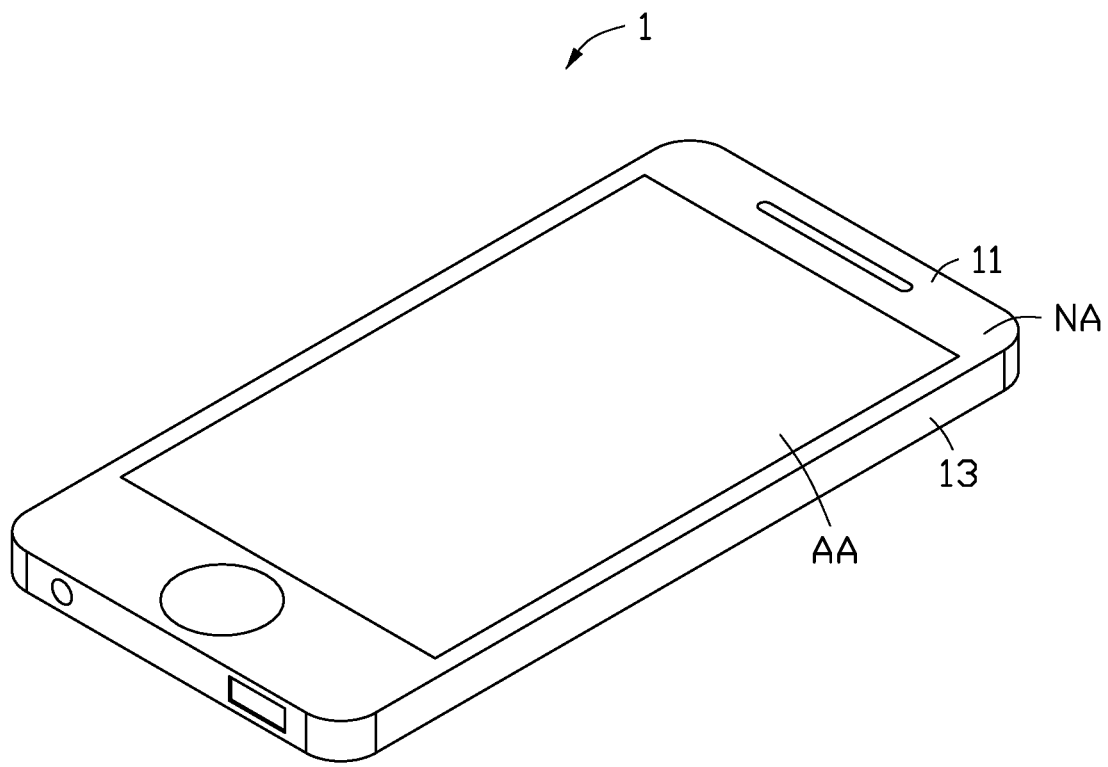
FIG. 1 is an isometric view of an embodiment of a touch display device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

Figure 2:
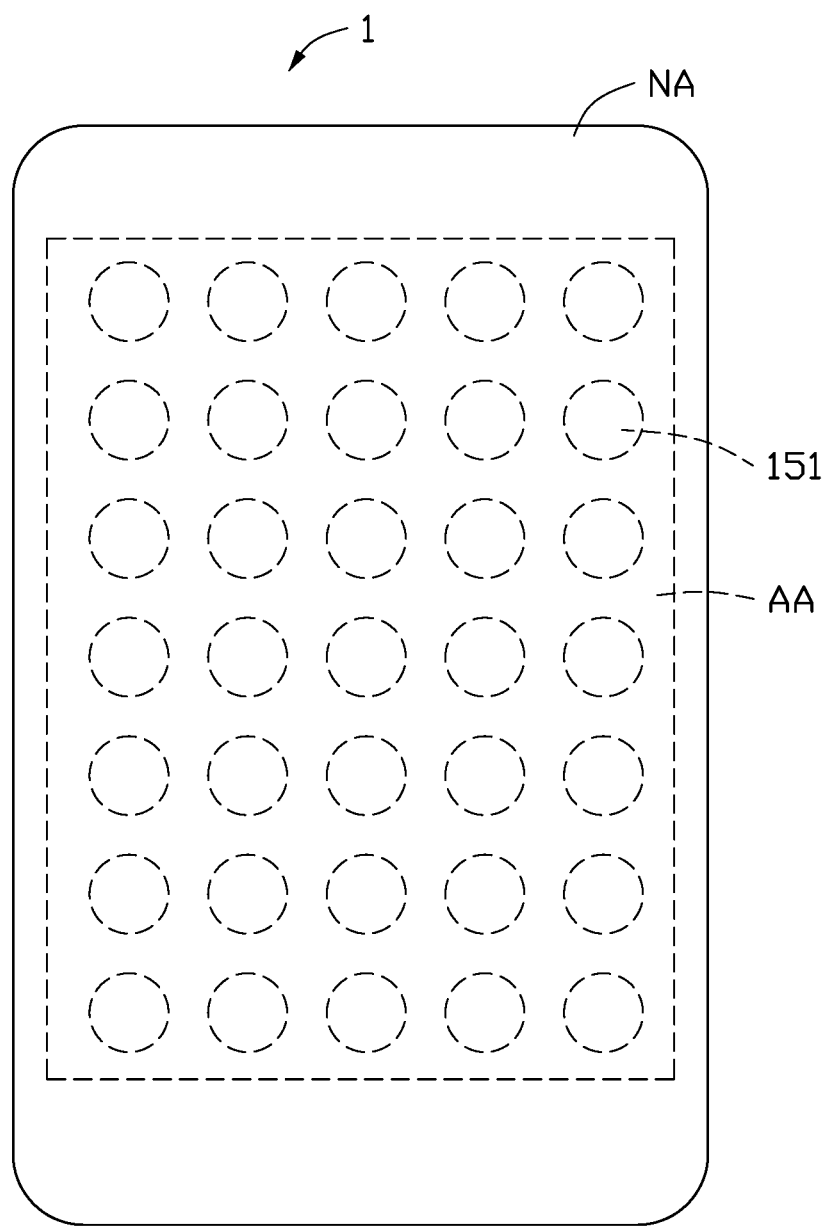
FIG. 2 is a planar view of the touch display device of FIG. 1.
Figure 3:
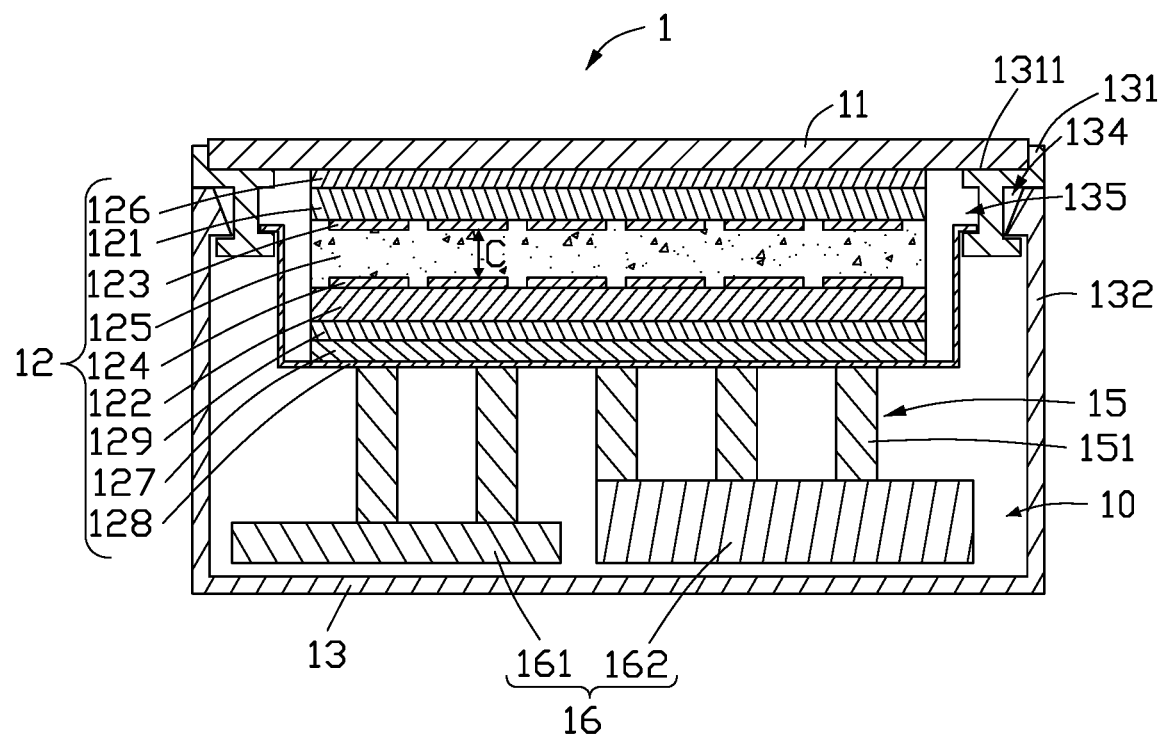
FIG. 3 is a cross-sectional view of the touch display device of FIG. 1.

FIG. 1 through FIG. 3 show a touch display panel 1 according to a first embodiment. In FIG. 1, the touch display panel 1 is used with a mobile phone. However, the touch panel can be used with devices other than mobile phones, such as tablets. The touch display panel 1 includes a front cover 11, a back cover 13, and a touch display module 12 (see FIG. 3). The back cover 13 defines a receiving cavity 10, and the front cover 11 covers the receiving cavity 10. The touch display module 12 is positioned in the receiving cavity 10. As shown in FIG. 1 and FIG. 2, the touch display panel 1 defines a display area AA and a border area NA surrounding the display area AA.

In FIG. 3, the touch display module 12 is located immediately below the front cover 11 and includes an upper substrate 121, a lower substrate 122 opposite to the upper substrate 121, and a liquid crystal layer 125 between the upper substrate 121 and the lower substrate 122. A first electrode layer 123 having a mesh pattern is formed on a surface of the upper substrate 121 adjacent to the lower substrate 122. A second electrode layer 124 having a pattern is formed on a surface of the lower substrate 122 adjacent to the upper substrate 121. In one embodiment, the upper substrate 121 is a color filtering substrate including color filtering elements (not shown) and the lower substrate 122 is a TFT substrate including a thin film transistor array (not shown). The touch display module 12 further includes an upper polarizer 126 between the front cover 11 and the upper substrate 121. The touch display module 12 further includes a lower polarizer 129 and a backlight module 127 located at a side of the lower substrate 122 away from the upper substrate 121. The lower polarizer 129 is between the lower substrate 122 and the backlight module 127.

Figure 4:
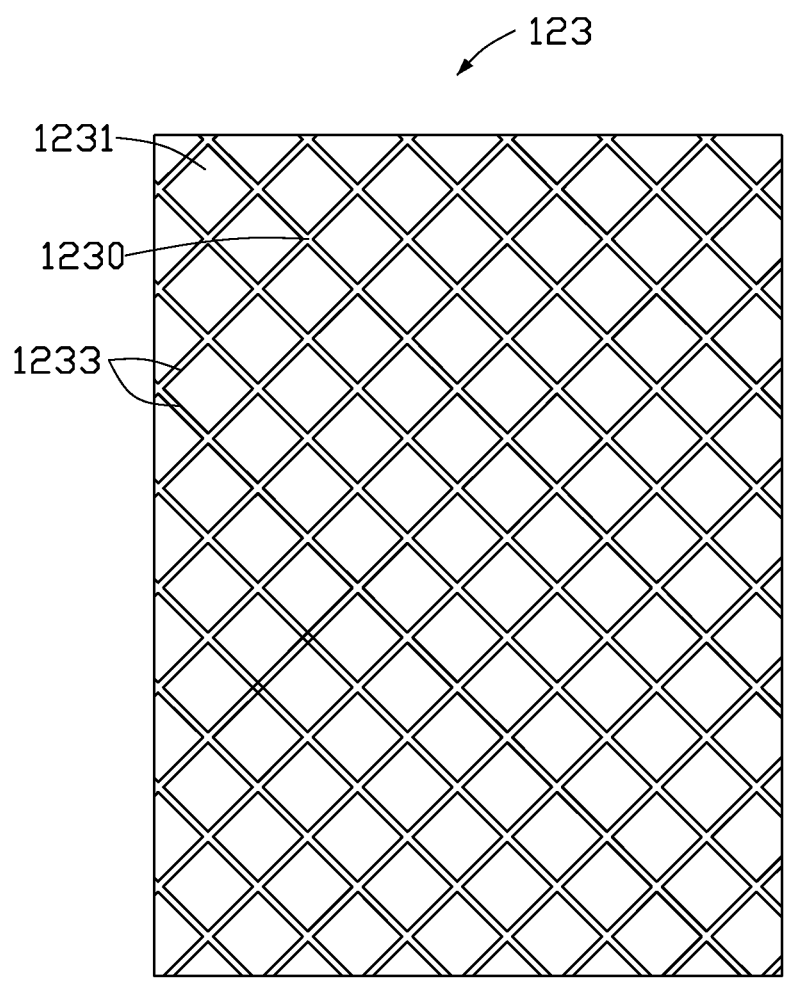
FIG. 4 is a planar view of a first electrode layer of the touch display device of FIG. 1.

In FIG. 4, the first electrode layer 123 includes a plurality of conducting lines 1233 intersecting with each other to form a mesh. A plurality of through holes 1231 is defined in the first electrode layer 123. The through holes 1231 may be rhombic-shaped or diamond-shaped, as shown, or have a different shape. The first electrode layer 123 includes a plurality of nodes 1230. Each node 1230 is formed where two conducting lines 1233 intersect with each other. In this embodiment, each opening 1231 is rhombic shape, and there is a node 1230 at each corner of each rhombic-shaped opening 1231. The through holes 1231 allow light from the backlight module 127 to pass through the first electrode layer 123, and electrical fields from the second electrode layer 124 to pass through the first electrode layer 123. The first electrode layer 123 is made of a conductive material, such as Indium tin oxide (ITO).

Figure 5:
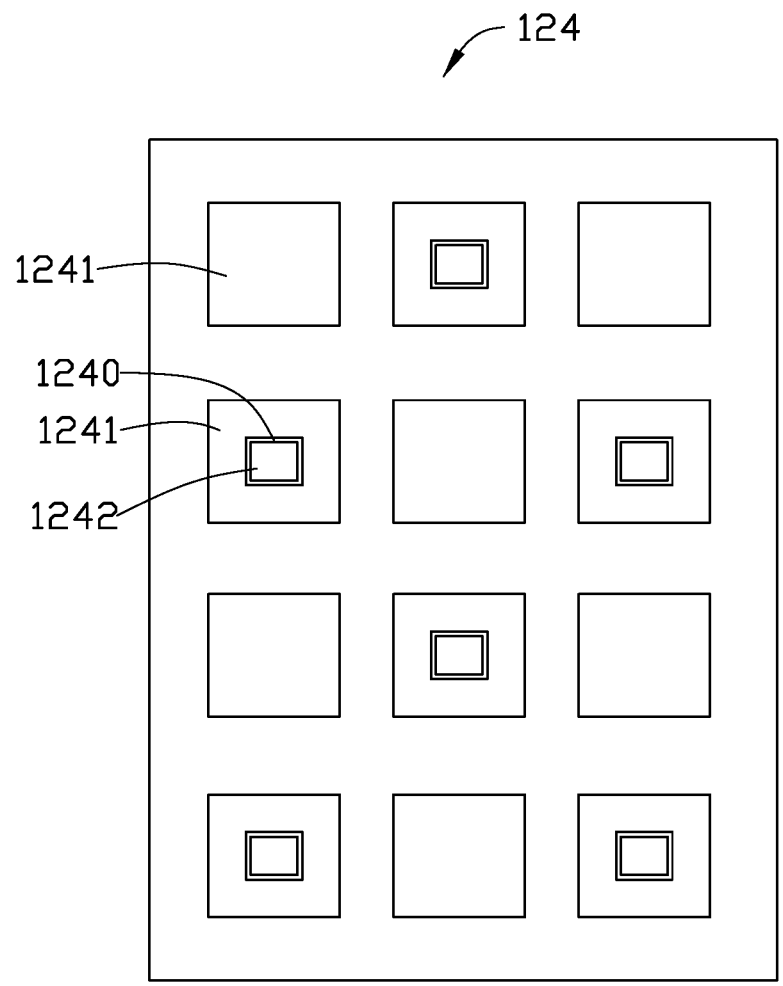
FIG. 5 is a planar view of a second electrode layer of the touch display device of FIG. 1.

In FIG. 5, the second electrode layer 124 includes a plurality of touch sensing electrodes 1241 and a plurality of force sensing electrodes 1242. The touch sensing electrodes 1241 are spaced apart from each other. In this embodiment, the touch sensing electrodes 1241 are arranged in a matrix. Also in this embodiment, the touch sensing electrodes 1241 can have one of two shapes, some touch sensing electrodes 1241 are a solid rectangular plate, and other touch sensing electrodes 1241 may have an overall rectangular shape with a rectangular opening 1240. Each force sensing electrode 1242 is located in one opening 1240, spaced apart from, and surrounded by, a touch sensing electrode 1241. The touch sensing electrode 1241 forms a self-capacitive structure configured for sensing a touch position.

Returning to FIG. 3, the first electrode layer 123 and the second electrode layer 124 both extend towards the liquid crystal layer 125 and face each other. Each force sensing electrode 1242 corresponds to and overlaps with the location of one node 1230 of the first electrode layer 123. The force sensing electrode 1242 and the first electrode layer 123 form a mutual capacitor C structure configured for detecting the touch force applied on the touch display device 1. When a touch force is applied on the front cover 11 of the touch display device 1, the front cover 11 and the touch display module 12 deform. The deformation causes a distance between the force sensing electrode 1242 and the first electrode layer 123 to changes. As the distance between the force sensing electrode 1242 and the first electrode layer 123 changes, a capacitance of the mutual capacitor C changes, and the touch force can be calculated according to the variation of the capacitance of the mutual capacitor C.

As shown in FIG. 3, the touch display panel 1 further includes a plurality of supporting elements 151 located at a side of the touch display module 12 opposite the front cover 11, particularly between the touch display module 12 and the back cover 13. The supporting elements 151 are spaced apart from each other. Each supporting element 151 is elastic. The supporting elements are configured for elastically resisting against the touch display module 12. FIG. 2 shows, each supporting element 151 is a columnar structure, for example, cylindrical. FIG. 2 also shows that the supporting elements 151 are in the display area AA. The supporting elements 151 may be made of an organic substance, such as polycarbonate (PC), polyimide (PI), polyethylene naphthalate (PEN), and polyethylene glycol terephthalate (PET).

Figure 7:
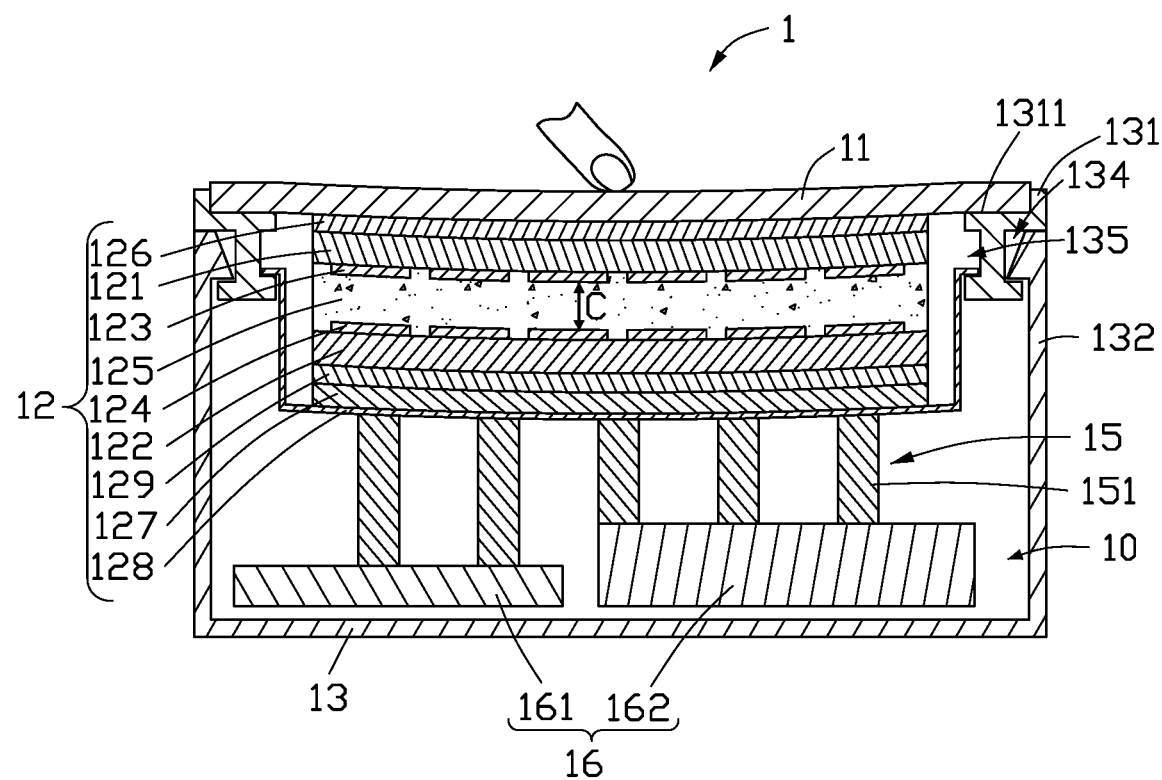
FIG. 7 is a cross-sectional view of the touch display device of FIG. 1 when being touched.

FIG. 7 shows that when a touch force is applied on the outside of the front cover 11 of the touch display device 1, the supporting elements 151 elastically deform and exert a force on the lower substrate 122. Thus, a greater touch force (that an inadvertent touch) is needed to make the touch display module 12 deform. The supporting elements 151 cause a greater touch force to need to be applied to the cover 11 to make the distance between the force sensing electrode 1242 and the first electrode layer 123 to reach a minimum value. With the mutual capacitor C structure, the supporting elements 151 can increase a range of the touch forces applied on the touch display device 1 that can be detected.

Figure 6:
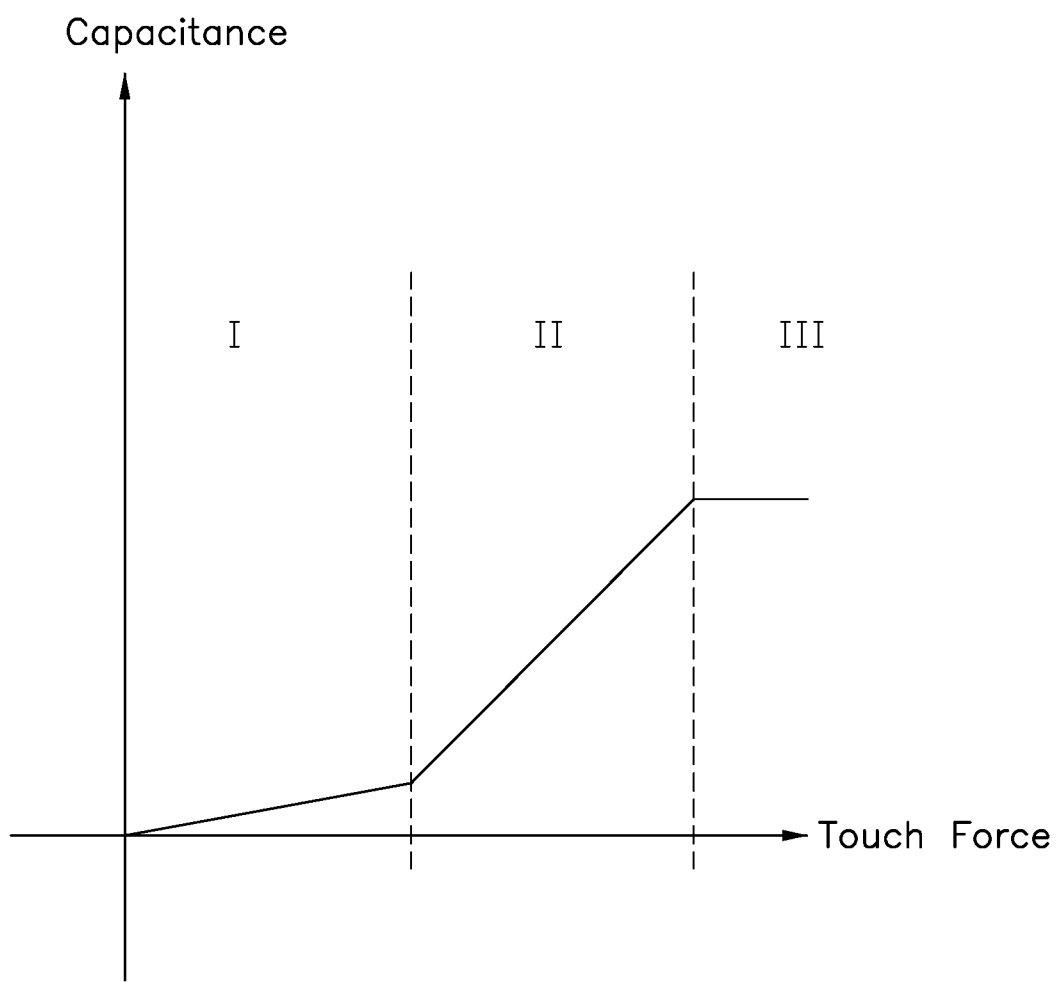
FIG. 6 is a graph showing a relationship between a touch force and a capacitance of a mutual capacitor C structure in the device of FIG. 1.

FIG. 6 shows a relationship between the touch force applied on the touch display device 1 and a capacitance of the mutual capacitor C structure. The abscissa X indicates the touch force, and the ordinate Y indicates the capacitance of the mutual capacitor C structure.

There are three capacitance stages shown in FIG. 6, which are an I-capacitance stage, a II-capacitance stage, and a III-capacitance stage. In the I-capacitance stage, the capacitance of the mutual capacitor C structure increases as the touch force applied on the touch display device 1 increases. During the I-capacitance stage, both the supporting element 151 and the touch display module 12 deform. During the II-capacitance stage, the supporting element 151 deforms its maximum amount and the capacitance of the mutual capacitor C structure more steeply increases as the touch force applied on the touch display device 1 increases. A ratio of the capacitance of the mutual capacitor C structure to the touch force in the capacitance stage-II is greater than a ratio of the capacitance of the mutual capacitor C structure to the touch force in the capacitance stage-I. During the III-capacitance stage, the touch display module 12 is already deformed its maximum amount and the distance between the force sensing electrode 1242 and the first electrode layer 123 reaches a minimum value, thus the capacitance of the mutual capacitor C structure cannot change despite the continued application of a touch force on the touch display device 1.

In FIG. 3 and FIG. 7, the touch display device 1 further includes a fixing frame 128 on a side of the backlight module 127 opposite from the lower polarizer 129. The fixing frame 128 is located between the backlight module 127 and the supporting elements 151. The fixing frame 128 is configured for supporting the touch display module 12. In this embodiment, the fixing frame 128 is made of a rigid material, such as a metal or an alloy; but that does not permanently deform when a force is applied to it by a user of the touch display device. The material used for the fixing frame 128 should have a fast rebounding speed. Therefore, when the touch force is removed, the fixing frame 128 will rebound and the touch display module 12 will quickly revert to an original state.

In FIG. 3 and FIG. 7, the front cover 11 and the back cover 13 are fixed together. The back cover 13 includes a receiving portion 131 and a main portion 132 engaged with the receiving portion 131. The receiving portion 131 surrounds a peripheral portion of the front cover 11. The main portion 132 forms the receiving cavity 10. The receiving portion 131 defines a first receiving groove 134 and a second receiving groove 135. The first groove 134 is defined on a surface of the receiving portion 131 adjacent to the touch display module 12. The second receiving groove 135 is defined on a surface of the receiving portion 131 opposite from the touch display module 12. One end of the main portion 132 is engaged in the first groove 134 of the receiving portion 131. The fixing frame 128 extends so that one end is engaged in the second receiving groove 135.

In FIG. 3 and FIG. 7, the touch display device 1 further includes other internal components 16. In this embodiment, the other internal components 16 may include a circuit board 161 and a battery 162 as shown in FIG. 3 and FIG. 7. Other internal components 16 may include a fingerprint recognition module or a camera module.

Figure 8:
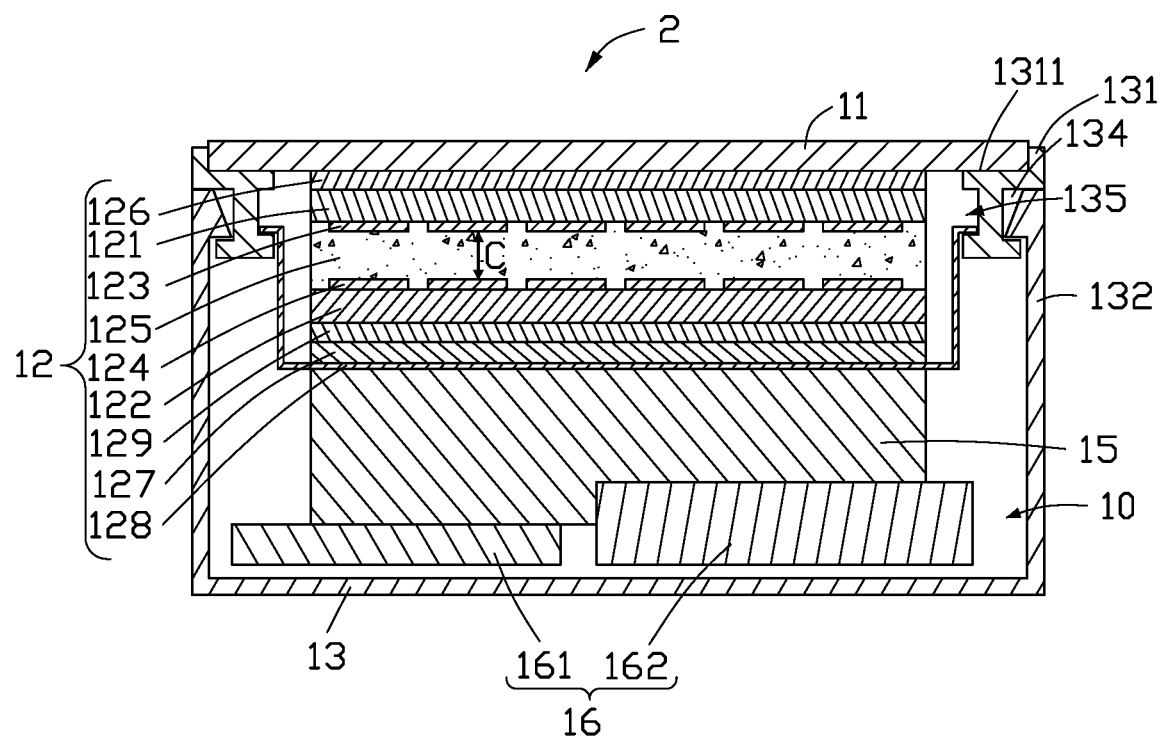
FIG. 8 is a cross-sectional view of the touch display device of a second embodiment.

FIG. 8 shows a touch display panel 2 according to another embodiment. The touch display panel 2 is substantially the same as the touch display panel 1, except that the touch display panel 2 includes only one supporting element 15 to support the touch display panel 12. The touch display panel 1 includes, as an example, the plurality of spaced-apart individual cylindrical supporting elements 151 that support the touch display panel 12. The supporting element 15 of FIG. 8 has a cross-sectional area that is greater than a total cross-sectional area of all the supporting elements 151.

Figure 9:
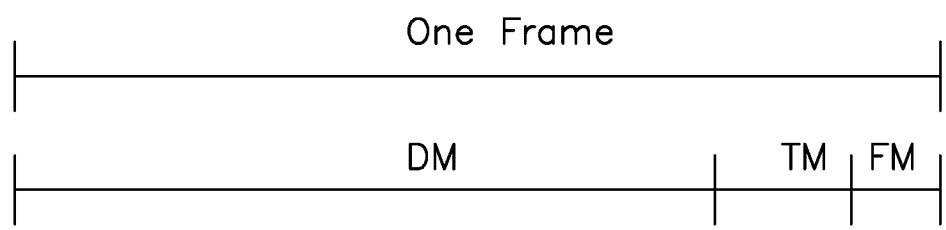
FIG. 9 is a first diagrammatic view of driving time sequence of the touch display device of FIG. 1.
Figure 10:
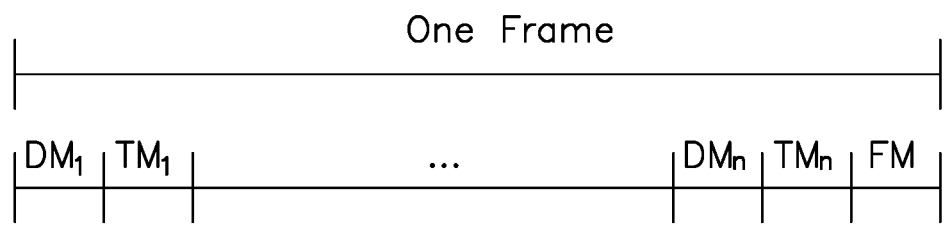
FIG. 10 is a second diagrammatic view of driving time sequence of the touch display device of FIG. 1.

FIG. 9 and FIG. 10 show two different driving time sequences of the touch display device 1. The touch sensing electrodes 1241 also function as common electrodes for image display. The touch display device 1 is driven by a time division driving method.

As shown in FIG. 9, one frame time, or a single frame, is divided into a display period (DM), a touch sensing period (TM), and a touch force sensing period (FM). The driving circuit of the touch display device alternately drives the touch display device to display during the DM, to detect touch position during the TM, and to detect touch force during the FM in one frame time.

As shown in FIG. 10, one frame time, or a single frame, is divided into a plurality of display sub-periods ($DM_1$ through $DM_n$), a plurality of touch sensing sub-periods ($TM_1$ through $TM_n$), and a plurality of touch force sensing sub-periods ($FM_1$ through $FM_n$). The display sub-periods ($DM_1$ through $DM_n$), the touch sensing sub-periods ($TM_1$ through $TM_n$), and the touch force sensing sub-periods ($FM_1$ through $FM_n$) alternate. The driving circuit of the touch display device repeatedly cycles the touch display device through the DM, TM, and FM periods, to display during each display sub-period, to detect touch position during each touch sensing sub-period, and to detect touch force during each touch force sensing sub-period in one frame time.

During the display period or the display sub-period, the first electrode layer 123 may be floating or may be supplied with a common voltage. Each touch sensing electrode 1241 and each force sensing electrode 1242 may be supplied with common voltages, the fixing frame 128 may be electrically grounded.

During the touch sensing period or the touch sensing sub-period, the first electrode layer 123 may be floating or applied with a common voltage; each touch sensing electrodes 1241 may be applied with a signal plus voltage; each force sensing electrode 1242 may be applied with common voltages; and the fixing frame 128 is electrically grounded.

During the touch force sensing period or the touch force sensing sub-period, the first electrode layer 123 may be floating or applied with a signal plus voltage; each touch sensing electrodes 1241 may be electrically grounded or applied with a common voltage; each force sensing electrode 1242 may be applied with a signal plus voltage; and the fixing frame 128 is electrically grounded.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A touch display device comprising:
a touch display module comprising:
a TFT substrate;
a color filtering substrate; and
a liquid crystal layer between the TFT substrate and the color filtering substrate;
wherein a first electrode layer is formed on a surface of the color filtering substrate facing the TFT substrate; a second electrode layer is formed on a surface of the TFT substrate facing the color filtering substrate;
wherein the touch display device further comprises at least one supporting element elastically resisting against the touch display module from a side of the TFT substrate opposite to the color filtering substrate; the at least one supporting element is elastic;
wherein:
the first electrode layer comprises a plurality of conducting lines intersecting with each other to form a mesh;
a plurality of through holes is defined in the first electrode layer;
the first electrode layer comprises a plurality of nodes; and
each of the plurality of nodes is formed where two conducting lines intersect with each other;
wherein the second electrode layer comprises a plurality of touch sensing electrodes spaced apart from each other; the plurality of touch sensing electrodes forms a self capacitor structure configured for sensing touch position;
wherein the second electrode layer further comprises a plurality of force sensing electrodes; some of the plurality of touch sensing electrodes each defines an opening; each of the plurality of force sensing electrodes is located in one opening, spaced apart from and surrounded by one of the plurality of touch sensing electrodes;
wherein each of the plurality of force sensing electrodes overlaps with one of the plurality of nodes; the plurality of force sensing electrodes and the first electrode layer form a mutual capacitor structure configured for detecting a touch force applied on the touch display device.

* * * * *